United States Patent [19]
Ray et al.

[11] Patent Number: 6,112,297
[45] Date of Patent: Aug. 29, 2000

[54] APPARATUS AND METHOD FOR PROCESSING MISALIGNED LOAD INSTRUCTIONS IN A PROCESSOR SUPPORTING OUT OF ORDER EXECUTION

[75] Inventors: David Scott Ray, Georgetown; Barry Duane Williamson, Round Rock; Shih-Hsiung Stephen Tung, Austin, all of Tex.

[73] Assignee: International Business Machines Corporation, Armonk, N.Y.

[21] Appl. No.: 09/021,133

[22] Filed: Feb. 10, 1998

[51] Int. Cl.⁷ ..................................................... G06F 9/312
[52] U.S. Cl. ......................... 712/225; 711/201; 712/300
[58] Field of Search ............................. 711/201; 712/225, 712/300

[56] References Cited

U.S. PATENT DOCUMENTS

| | | | |
|---|---|---|---|
| 4,287,561 | 9/1981 | Liptay | 712/217 |
| 4,814,976 | 3/1989 | Hansen et al. | 711/201 |
| 5,557,763 | 9/1996 | Seuter et al. | 712/23 |
| 5,577,200 | 11/1996 | Abramson et al. | 714/50 |
| 5,802,556 | 9/1998 | Patel et al. | 711/109 |

FOREIGN PATENT DOCUMENTS

| | | |
|---|---|---|
| 54-8937 | 1/1979 | Japan . |
| 09114733 | 5/1997 | Japan . |

*Primary Examiner*—Kenneth S. Kim
*Attorney, Agent, or Firm*—Anthony V. S. England

[57] ABSTRACT

One aspect of the invention relates to a method for processing load instructions in a superscalar processor having a data cache and a register file. In one embodiment, the method includes the steps of dispatching a misaligned load instruction to access a block of data that is misaligned in the cache; while continuing to dispatch aligned instructions: generating a first access and a final access to the cache in response to the misaligned load instruction; storing data retrieved from the first access until data from the final access is available; reassembling the data from the first and final access into the order required by the load instruction; and storing the re-assembled data to the register file.

9 Claims, 4 Drawing Sheets

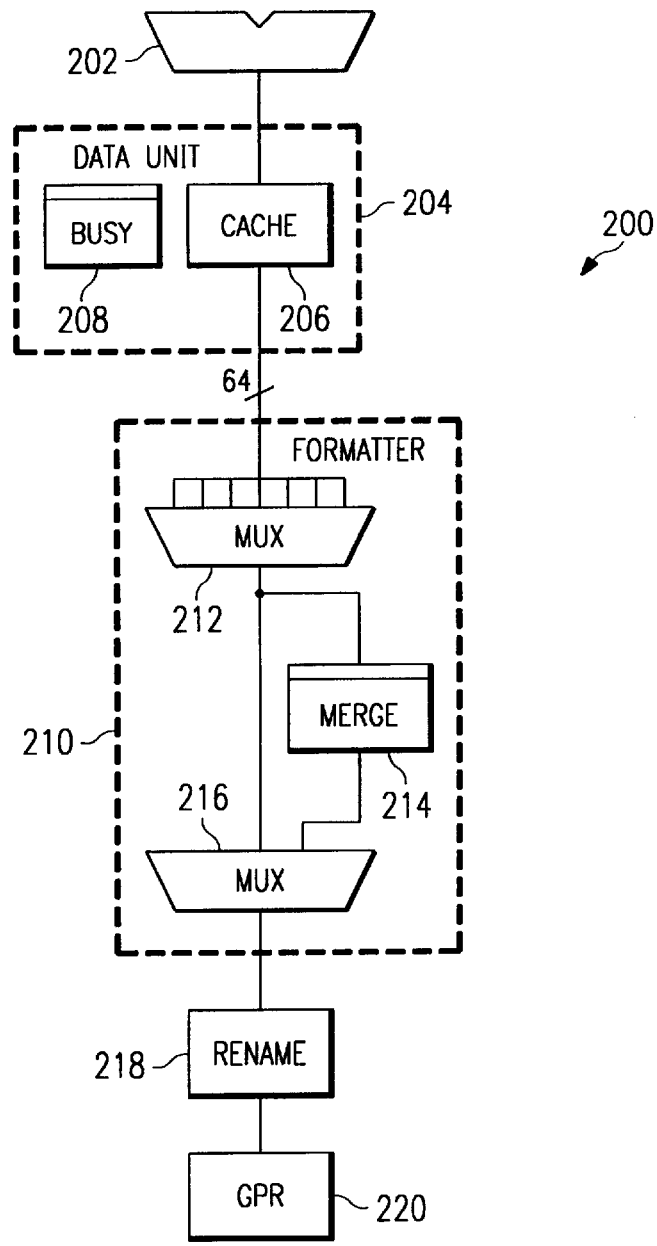

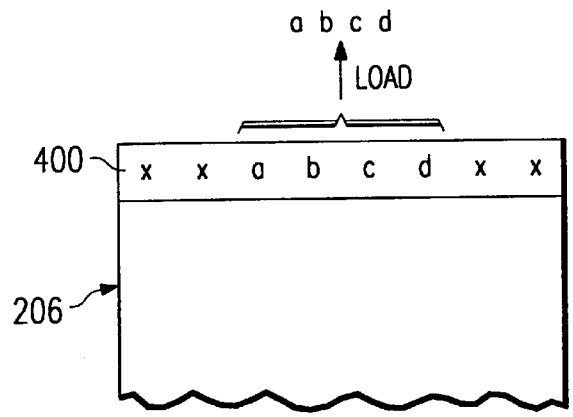
FIG. 4A
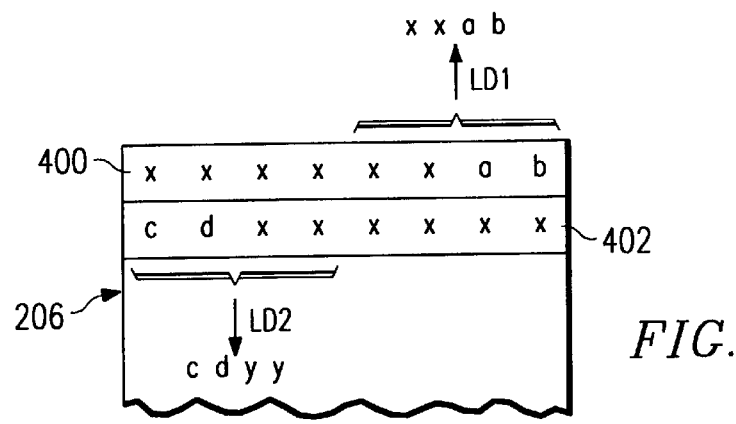
FIG. 4B
| OP | DATA | REQUEST |
|---|---|---|
| LD1 | ab | FIRST |
| LD2 | cd | FINAL |
FIG. 5
| | FIRST/FINAL | REAL ADD |
|---|---|---|
| 0 | | |
| 1 | | |
| . | | ○ |
| . | | ○ |
| . | | ○ |
| n | | |
FIG. 6

APPARATUS AND METHOD FOR PROCESSING MISALIGNED LOAD INSTRUCTIONS IN A PROCESSOR SUPPORTING OUT OF ORDER EXECUTION

FIELD OF THE INVENTION

This invention relates generally to the field of computer processors, and more particularly, to processors which are integrated on a single microprocessor chip. Still more particularly, the invention relates to speculative access of mis-aligned memory data.

BACKGROUND OF THE INVENTION

Providing ever faster microprocessors is one of the major goals of current processor design. Many different techniques have been employed to improve processor performance. One technique which greatly improves processor performance is the use of cache memory. As used herein, cache memory refers to a set of memory locations which are formed on the microprocessor itself, and consequently, has a much faster access time than other types of memory, such as RAM or magnetic disk, which are located separately from the microprocessor chip. By storing a copy of frequently used data in the cache, the processor is able to access the cache when it needs this data, rather than having to go "off chip" to obtain the information, greatly enhancing the processor's performance.

However, certain problems are associated with cache memory. One problem occurs when the data in the cache memory becomes misaligned with respect to the cache boundaries. Although many of the newer software compilers endeavor to avoid the problem of misalignment, nevertheless certain types of operations, such as the familiar COMMON statement in the FORTRAN programming language frequently causes cache misalignment, and in order to maintain complete software capability, a processor must have the ability to handle the misaligned cache data. The problem of misaligned data in cache memory is described in greater detail with respect to FIGS. 1A and 1B.

FIG. 1A is a diagram depicting the contents of a conventional cache memory, such as the cache memory used in the POWER PC family of processors available from IBM Corporation. As shown, the cache 100 contains a number of "cache lines", each cache line being 128 bytes wide. However, a maximum of 8 bytes may be read from the cache during any single access. As used herein, the term "word" shall refer to a four byte block of data and the term "double word" shall refer to an eight byte block of data. FIG. 1A shows a double word within cache line 0. The first word is xxab and the second word is cdxx, where a, b, c and d are desired bytes of data and "x" represents unneeded bytes of data. Conventionally, processors are designed to allow an n-bit wide transfer between the processor's execution units and the cache memory. For purposes of illustration, it will be assumed that the processor which accesses the cache shown in FIG. 1A allows a 32 bit, or one word, wide data transfer. Any word within any cache line of cache 100 may be retrieved by a single load instruction. Similarly, any word in any cache line may be written by operation of a single store instruction. If the processor requires the word containing the bytes a, b, c and d, it should be clear from the above that only a single load instruction is required to obtain all four bytes of data from the cache, since all of the required data resides in a single double word of the cache line.

Referring now to FIG. 1B, the same data is shown stored in the cache 100. However, this time it is misaligned in relation to the cache boundary. Specifically, it is seen that bytes a, b and c of the requested word are stored in cache line 0, but byte d is stored in cache line 1. Now the processor must make two accesses to the cache in order to obtain all four bytes of data. Moreover, since the data is coming back from the cache in two separate accesses, it must be reassembled before it is written into one of the processor's architected registers.

FIG. 1C is a schematic diagram of a conventional circuit for reassembling misaligned data returned from a cache access. The Circuit 300 is typically referred to as a load formatter. The formatter includes Formatter Control Logic 302 which provides the required control signal to operate the other components of the Circuit 300. Also included in formatter 300 is a rotator 304, Merge Latch 306 and a Multiplexor 308. The rotator 304 receives data from the cache, and depending on the signals received from the format control logic 302, arranges the data into eight byte blocks which can be shifted to any desired eight bit location in the rotator 304. In the present case, the bytes a, b and c are rotated to the left most position of the rotator then passed to the Merge Latch 306 which holds the data while the processor makes a second access to line 1 of the cache. When the processor accesses cache line 1, it retrieves byte d and passes it to the Rotator 304 which rotates it to the fourth byte position from the left. Afterwards, it is passed directly to multiplexor 308 along with bytes a, b and c from Merge Latch 306. In this way, the data is correctly reassembled and then passed to the architectural registers on the processor.

Superscalar processors achieve performance advantages over conventional scalar processors because they allow instructions to execute out of program order. In this way, one slow executing instruction will not hold up subsequent instructions which could execute using other resources on the processor while the slower instruction is pending.

However, misaligned accesses to the cache memory do not lend themselves to superscalar processing because of the possibility that the data may return from the cache out of order. Specifically, referring again to the example above, if for some reason the second load instruction completed before the first load instruction, then the data containing byte d would enter the formatter first followed by the data containing bytes a, b and c. In this case, when the data is reassembled, the order of the bytes would be incorrect. One solution to this problem is to prohibit misaligned cache access instructions from speculatively executing. In order words, when the superscalar processor recognizes that a misaligned access to the cache is about to occur, it ceases issue of instructions subsequent to the misaligned cache access instruction, and stalls while it waits for the instructions issued prior to the cache access instruction to complete. Then, it processes the two cache access instructions in order. In this way, the misaligned cache access is guaranteed to complete in order. Although this solves the above mentioned problem, it also reduces the processor's performance. It is thus one object of the invention to provide a superscalar processor which allows speculative execution of misaligned cache access instructions. Further objects and advantages of the present invention will become apparent in view of the following disclosure.

SUMMARY OF THE INVENTION

In one version of the invention, cache accessing instructions, such as loads and stores, are provided with a tag which labels each instruction as a first, final or not misaligned instruction. On dispatch, if it is recognized that the instruction is a misaligned cache access, then it will be tagged "first" by the load/store unit control logic. At the same time, a bit is set in a Misaligned/Busy latch which is operated by the load/store unit logic. When the second cache access instruction for the required data access is dispatched, it is tagged as "final". Once the "final" cache access instruction is dispatched, no further misaligned cache access instructions will be dispatched until the "first" and "final" instructions have completed. However, other aligned cache access instructions will be permitted to execute and complete. In this way, the processor still allows speculative execution of instructions during the pendency of the first and final cache access instructions.

Aligned instructions do not require use of the Merge Latch and therefore, may proceed through the formatter and into the processor registers without interfering with the processing of the first and final instructions. When the first instruction finishes, it is passed to the formatter which stores the data in the Merge Latch. Any number of aligned cache accesses may proceed through the formatter while data from the first access is stored in the Merge Latch. When the "final" instruction is finished and passed to the formatter, then the load/store unit control logic recognizes this data is to be merged with the data stored in the Merge Latch. The merge is performed, and the reassembled data is then passed to registers on the processor. Afterwards, the Misaligned/Busy latch is cleared to allow dispatch of any subsequent misaligned cache access instructions. Since only one misaligned cache access instruction is permitted to be pending in the processor at any given time, there is no danger of corruption of the Merge Latch. If the final cache access instruction is finished and passed to the formatter before the first cache access instruction, then this data is simply discarded. In one particular version of the invention, the mis-queue table is used to hold the data for the final instruction if the final instruction finishes before the first instruction.

BRIEF DESCRIPTION OF THE DRAWINGS

FIG. 2 is a schematic diagram of a circuit for performing misaligned cache accesses according to an embodiment of the invention.

FIG. 3 is a table showing the operation of the first/final tag according to an embodiment of the invention.

FIGS. 4A–4B illustrate aligned and misaligned cache accesses, respectively, according to an embodiment of the invention.

FIG. 5 illustrates the application of the first and final tags to a pair of primitive load instructions which are generated in response to the dispatch of a load instruction.

FIG. 6 illustrates the logical contents of a mis-queue table according to an embodiment of the invention.

DETAILED DESCRIPTION OF EMBODIMENTS OF THE INVENTION

Figure 1A:
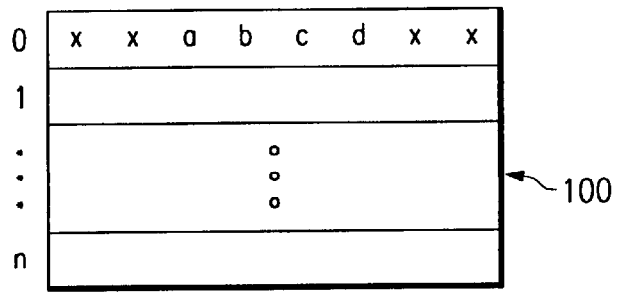
FIG. 1A depicts the logical contents of a cache memory showing aligned data.
Figure 1B:
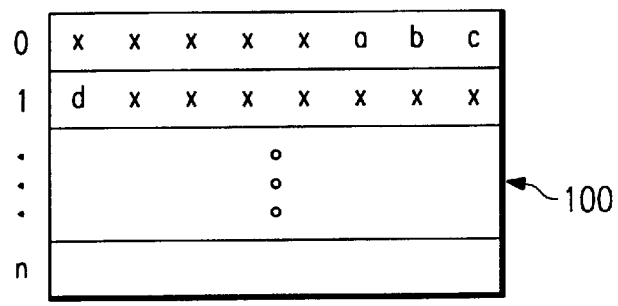
FIG. 1B depicts a cache memory having misaligned cache data across two cache lines.
Figure 1C:
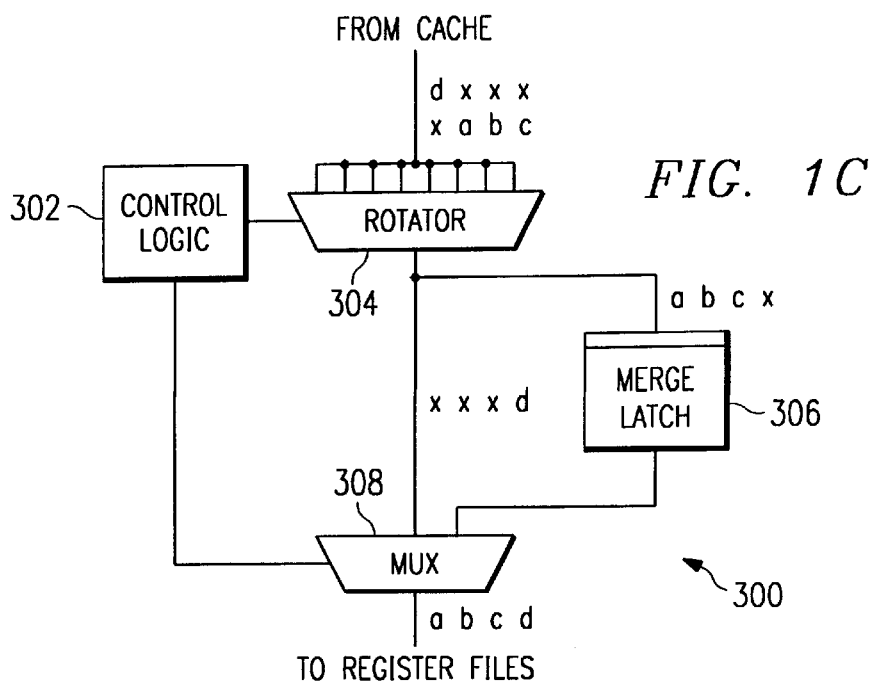
FIG. 1C is a schematic diagram showing a formatter for reassembling misaligned data retrieved from cache memory.
Figure 1D:
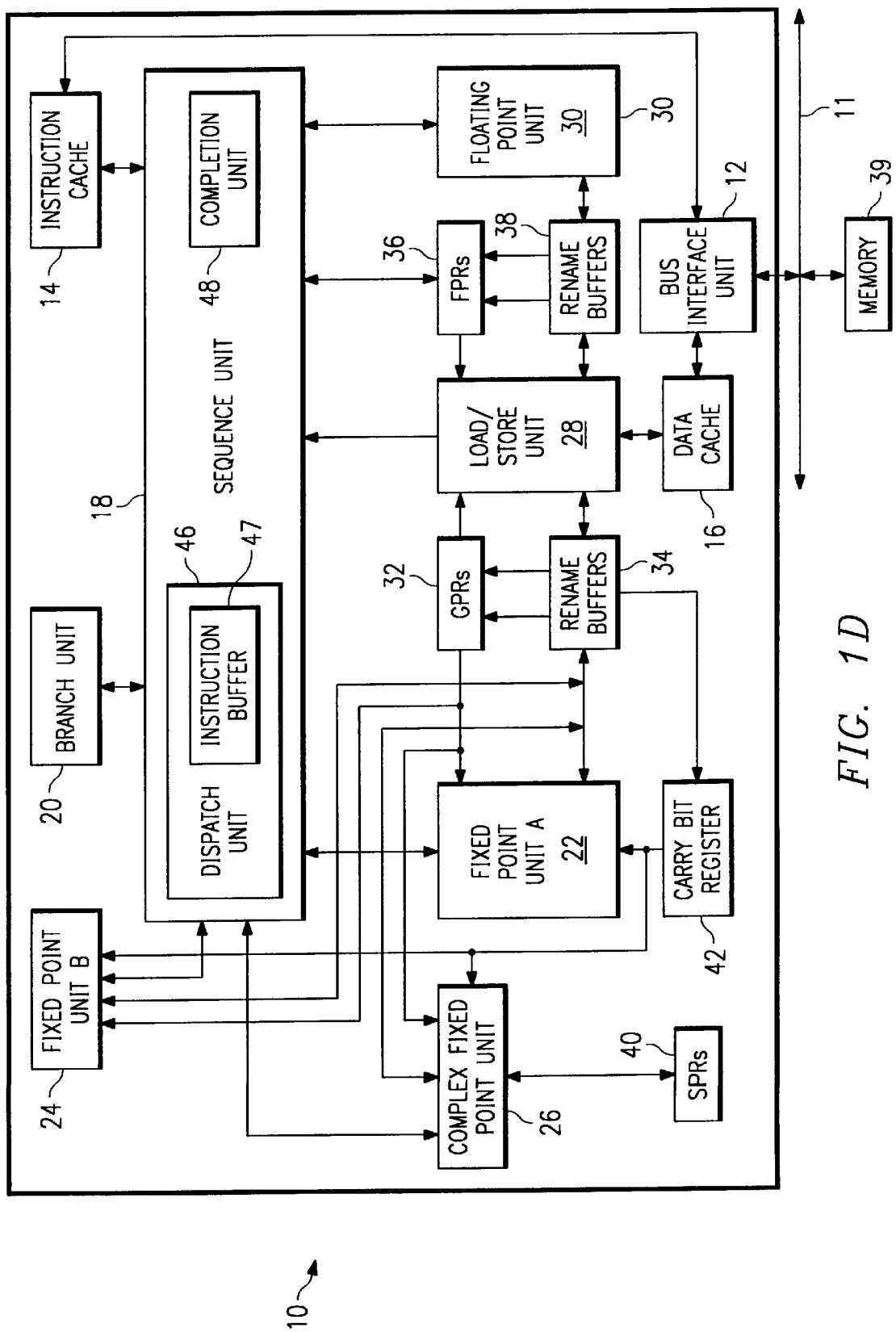
FIG. 1D is a block diagram of a processor according to an embodiment of the invention.

FIG. 1D is a block diagram of a processor system 10 for processing information in accordance with the present invention. In the preferred embodiment, processor 10 is a single integrated circuit superscalar microprocessor, such as the PowerPC™ processor from IBM Corporation, Austin, Tex. Accordingly, as discussed further hereinbelow, processor 10 includes various units, registers, buffers, memories, and other sections, all of which are formed by integrated circuitry. Also, in the preferred embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and a fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 26 and floating point rename buffers 38. FPU 30 outputs results (destination operand information) of its operation for storage at selected entries in floating point rename buffers 38.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches through a dispatch unit 46 the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, Oring and XORing. CFXU 26 executes a second class of fixed point operations on source operands, such as fixed point multiplication and division. FPU 30 executes floating point operations on source operands, such as floating point multiplication and division.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "pipelining". In a significant aspect of the preferred embodiment, an instruction is normally processed at six stages, namely fetch, decode, dispatch, execute, completion and writeback.

In the preferred embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

In response to a Load instruction, LSU 28 inputs information from data cache 26 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16 or memory.

As an example of the interaction among the execution units, e.g., FXUA 22, FXUB 24, rename buffers 34, and the dispatch unit 46, an instruction "add c,a,b" is dispatched from the dispatch unit 46 to the FXUA 22. The dispatch unit 46 provides the FXUA 22 with tags for the operands "a" and "b" to tell the FXUA 22 where to retrieve the data for the operands, as is well understood by those skilled in the art. For example, in a system with six rename buffers, the dispatch unit 46 might suitably tag the operand for "a" as being located in a rename buffer 1 with a six bit tag 100000. A tag of 010000 might then suitably be used to indicate that the operand "b" is in the rename buffer 2. Since the FXUA 22 does not write into GPRs 32, the dispatch unit 46 must use a rename buffer tag for the target of the operation, such as 001000, for the result of the "add" instruction to be placed in rename buffer 3.

Referring now to FIG. 2, there is shown a schematic diagram illustrating a circuit for processing load instructions according to an embodiment of the invention. The circuit 200 includes logic such as adder 202 which is used to calculate the effective address required to access data in the cache 206. Naturally, the invention lends itself to any number of memory addressing schemes well known in the art. For purposes of illustration, the operation of the invention will be described with respect to the exemplary POWER PC microprocessor architecture. The POWER PC architecture is fully described in various publications, such as the *Power PC Microprocessor Family: the Programming Environment,* available from IBM Microelectronics as Publication No. MPRPPCFPE-01, incorporated herein by reference. The effective address generated by adder 202 is passed to the data unit 204 which contains the control logic required to physically access the cache 206. The data unit 204 also includes a Misaligned/Busy latch 208 which tracks whether the circuit 200 is currently processing a misaligned load instruction. This feature of the invention will be described in greater detail herein.

Cache 206 has an output port connected to, in this case, a 64-bit data line which passes data from the cache 206 into the Formatter 210. The design and operation of Formatters are well known in the art and will be described herein only to the extent required to illustrate the present invention. In the embodiment shown, Formatter 210 includes a Rotator 212 which is adapted to re-position or "rotate" the data from the 64-bit data line along any given 8 bit boundary. In other words, any byte of data received from the 64-bit data line may be repositioned to a lower or higher order position within the double word contained in Rotator 212. As used herein, the term "double word" shall refer to an eight byte segment of data, and the term "word" shall refer to a four byte segment.

The output of the Rotator 212 is connected to both a Merge Latch 214 and a Multiplexor 216. Merge Latch 214 is used only in conjunction with misaligned data loads. Multiplexor 216 passes the data from Rotator 212, and if necessary, Merge Latch 214 into the rename register file 218. Multiplexor 216 is designed to pass data from Rotator 212 and Merge Latch 214 simultaneously. Thus, Multiplexor 216 operates to re-assemble the data retrieved by a misaligned load instruction before passing it to the rename register file.

Finally, as is conventional, after completion of the load instruction, the data from the appropriate register in the rename register file 218 for the completed instruction is passed to the corresponding register in the GPR register file 220. Of course, it will be understood by those of skill in the art that rename register 218 and GPR register file 220 are not necessarily physically separate register files, but may be unified register files and the data stored in the registers therein designated as rename or GPR data depending on the status of status bits associated with the registers.

According to embodiments of the present invention, when the load/store unit (not shown) executes a load instruction, it also associates a first/final tag with the instruction that is used to track the instruction as it progresses through the circuit 200. In one particular embodiment, the first/final tag is a 2-bit wide data segment which is appended to the instruction. FIG. 3 is a table illustrating operation of the first/final tag according to one version of the invention. In this embodiment, it is not permitted for both the first and final bytes to be low. If the first bit is low and the final bit is high, then the load instruction is marked as "final", and will represent the second data access to the cache 206 required by the misaligned instruction. If the first bit is high and the final bit is low, then the instruction is marked as "first", and represents the first data access to the cache 206 of the misaligned instruction. If both the first and final bits are high, then the instruction is not misaligned and may progress through circuit 200 normally.

The operation of the present invention will be described in greater detail with respect to FIGS. 4A and 4B. FIG. 4A is a view showing a portion of logical contents of cache memory 206. In this case, each line of cache memory 206 is 128 bytes wide and is double word addressable. It is to be understood that only one double word is shown in the cache line 400. In the example, it is desired to access the word containing bytes a, b, c and d from cache line 400. The data is aligned in cache line 400, and a single load instruction may be issued to retrieve it.

Referring now to FIGS. 2 and 4B, the data is misaligned because it spans a cache line boundry. However, it will be understood that data could also be misaligned within a cache line if it is not aligned on a double word boundry. It will also be understood that each access of the cache returns a double word according to the POWERPC architecture. If an instruction is dispatched which attempts to load bytes a, b, c, d, it is seen that two accesses to the cache 206 will be required, one to cache line 400 and the other to cache line 402. In this case, logic in data unit 204 recognizes the data required by the instruction is misaligned. In turn, the logic generates two "primitive" instructions LD1 and LD2 needed to obtain the data. Primitive instructions are used only internally by the LSU to perform the necessary cache accesses. LD1 will be marked as "first" and LD2 will be marked as "final" as shown in FIG. 5. At the same time, the data unit 204 asserts a bit the Misaligned/Busy latch 208. This causes the dispatch unit to halt any further issue of misaligned instructions. However, other instructions, including aligned load instructions may still be dispatched and processed by the circuit 200. This is because the aligned instructions do not require the use of Merge Latch 214. Thus, if a misaligned instruction had previously written data from the first cache access into the Merge Latch 214, and was waiting for data to be retrieved from the second access, an aligned instruction could still pass this data from Rotator 212 through Multiplexor 216, and into the renames, without disturbing the data stored in Merge Latch 214. In other embodiments, this feature of the invention is extended so that multiple Merge Latches could be provided to allow multiple misaligned instructions to be concurrently pending in the processor. Naturally, the means for tracking first and final tags for each misaligned instruction would be similarly extended.

When data from LD1 is received by the Formatter 210, the data is rotated in Rotator 212, as required, and placed in Merge Latch 214 where it is stored awaiting data from the final load instruction. As stated previously, aligned instructions may continue to use Formatter 210 to process their data. When the data from LD2 is received by Formatter 210, it is rotated in Rotator 212 and passed in Multiplexor 216. At this point, data from Merge Latch 214 is also passed to Multiplexor 216 where it is reassembled into the required word consisting of bytes a, b, c and d. It is then passed to Rename Register File 218 and GPR 220 according to conventional superscalar techniques.

Since the processor provides out of order processing instructions, it is possible that data from a final load instruction may be passed to Formatter 210 before data from the first instruction. In this case, logic in Formatter 210 recognizes that Merge Latch 214 does not contain any valid data and, therefore, discards the data passed to it by the final load instruction. After the data from the first instruction is stored in the Merge Latch, the data from the final instruction is again passed to the Formatter. Of course, the processor must be provided with some means for resending the data from the final instruction in this situation without requiring the dispatch unit to re-issue the original misaligned load instruction. Numerous suitable ways for accomplishing this will occur to those of skill in the art. For example, in one embodiment of the invention, a "mis-queue" table is used to resend data from the final instruction if data from the first instruction is not present in the Merge Latch. This will be described in greater detail with respect to FIG. 6.

FIG. 6 is a diagram depicting the logical contents of a mis-queue table according to an embodiment of the invention. As shown, each entry in the mis-queue table includes a first/final tag for the instruction as well as the instruction's real address. Other information, such as validity bits, status bits, etc. may be provided as a matter of design choice. In one embodiment of the invention, each time an instruction is dispatched an entry in the Mis-Queue Table 600 is created. If the instruction hits in the data cache, then on the following cycle the entry for that instruction is removed from the Mis-Queue Table 600. However, if the instruction misses in the data cache, then its real address, and other information remains in the Mis-Queue Table 600. The processor continually scans the entries in the Mis-Queue Table, and each cycle the processor attempts to access the cache at the real addresses stored in the table. Eventually, the data becomes available in the cache for each of the entries in the Mis-Queue Table and is passed onto the register files.

According to one embodiment of the present invention, an event in which the data from the final access is passed to the Formatter before the data from the first access is treated similarly to cache miss. Thus, on each cycle, the processor scans the Mis-Queue Table 600, accesses the cache data for the address of the final instruction stored in the Mis-Queue Table 600 and passes it to the Formatter. The Formatter is responsive to validity signals received from the cache control logic. If the cache passes data for the final instruction to the Formatter before data from the first instruction is available, then the validity signal for this data is not asserted. Accordingly, the Formatter will discard this data and the entry for the final instruction will remain in the Mis-Queue Table 600. After the data from the first instruction becomes available and is passed to the Formatter, then on a subsequent cycle, the data from the final instruction is again passed to the formatter, but this time the validity signal is asserted. The formatter then processes the data from the first and final instructions and provides a signal back to the completion table logic to remove the first and final entries from the Mis-Queue Table 600.

After the final access has retrieved its data from the cache, then the load instruction is ready for completion. At completion, the bit in the Misaligned/Busy Latch 208 is cleared and the load/store unit may now issue subsequent misaligned instructions.

According to still a further embodiment, the Formatter could be designed such that if the final data is received before the first data then the final data is stored in the merge latch. When the first data is received, it would then be reassembled with the final data and forwarded to the rename register file. If the formatter is implemented in this manner, the use of the Mis-Queue Table 600 could be avoided.

Although the present invention has been described with respect to the specific embodiments above, it will be appreciated by those of skill in the art that variations in form and detail may be made without departure from the scope and spirit of the present invention. For example, multiple load/ store units can be used in parallel with the processing of instructions according to other embodiments of the invention.

What is claimed:

1. A method for processing load instructions in a superscalar processor having a data cache and a register file, the method comprising:

dispatching a misaligned load instruction to access a block of data that is misaligned in the cache;

continuing to dispatch aligned load instructions while the misaligned load instruction is being processed;

generating a first access and a final access to the cache in response to the misaligned load instruction;

storing data retrieved from the first access until data from the final access is available;

reassembling the data from the first and final access into the order required by the misaligned load instruction;

storing the re-assembled data to the register file; and asserting a signal responsive to the dispatch of the misaligned load instruction which causes the processor to halt the dispatch of subsequent misaligned load instructions, thereby preventing such subsequent misaligned load instructions from interfering with the step of storing data retrieved from the first access until data from the final access is available.

2. A method as in claim 1 wherein generating a first access and a final access comprises associating a plurality of bits with the accesses which indicate whether the access is the first or final access.

3. A method as in claim 1 further comprising the step of asserting a signal responsive to completion of the misaligned load instruction which causes the processor to resume dispatch of misaligned instructions.

4. A circuit for processing load instructions in a superscalar processor having a data cache and a register file, the circuit comprising:

means for dispatching instructions;

means for detecting the dispatch of a misaligned load instruction that accesses a block of data that is misaligned in the cache;

means for halting the dispatch of subsequent misaligned load instructions when the misaligned load instruction is detected while subsequent aligned instructions are dispatched;

means for generating a first access and a final access to the cache in response to the misaligned load instruction;

means for storing data retrieved from the first access until data from the final access is available;

means for reassembling the data from the first and final accesses into the order required by the load instruction;

means for storing the re-assembled data to the register file.

5. A circuit as in claim 4 wherein the means for reassembling the data comprises a latch for storing the data from the second access until data from the first access is available.

6. A circuit as in claim 4 wherein the means for halting the dispatch of subsequent misaligned load instructions comprises a latch having a bit that is asserted in response to the dispatch of the misaligned instruction and unasserted when the misaligned instruction is completed.

7. A circuit as in claim 4 wherein the means for generating a first access and a final access comprises logic for generating tags that are associated with the first and final accesses.

8. A circuit as in claim 7 wherein the tags comprise a plurality of bits which are asserted responsive to whether a corresponding access is a first or final access.

9. A circuit as in claim 4 wherein the means for reassembling the data comprises a latch for storing the data from the first access until data from the second access is available.

* * * * *